No. 798,448. PATENTED AUG. 29, 1905.
A. POGANY & H. LAHMANN.
MECHANISM FOR CORRUGATING TUBES.
APPLICATION FILED FEB. 15, 1904
4 SHEETS—SHEET 1.
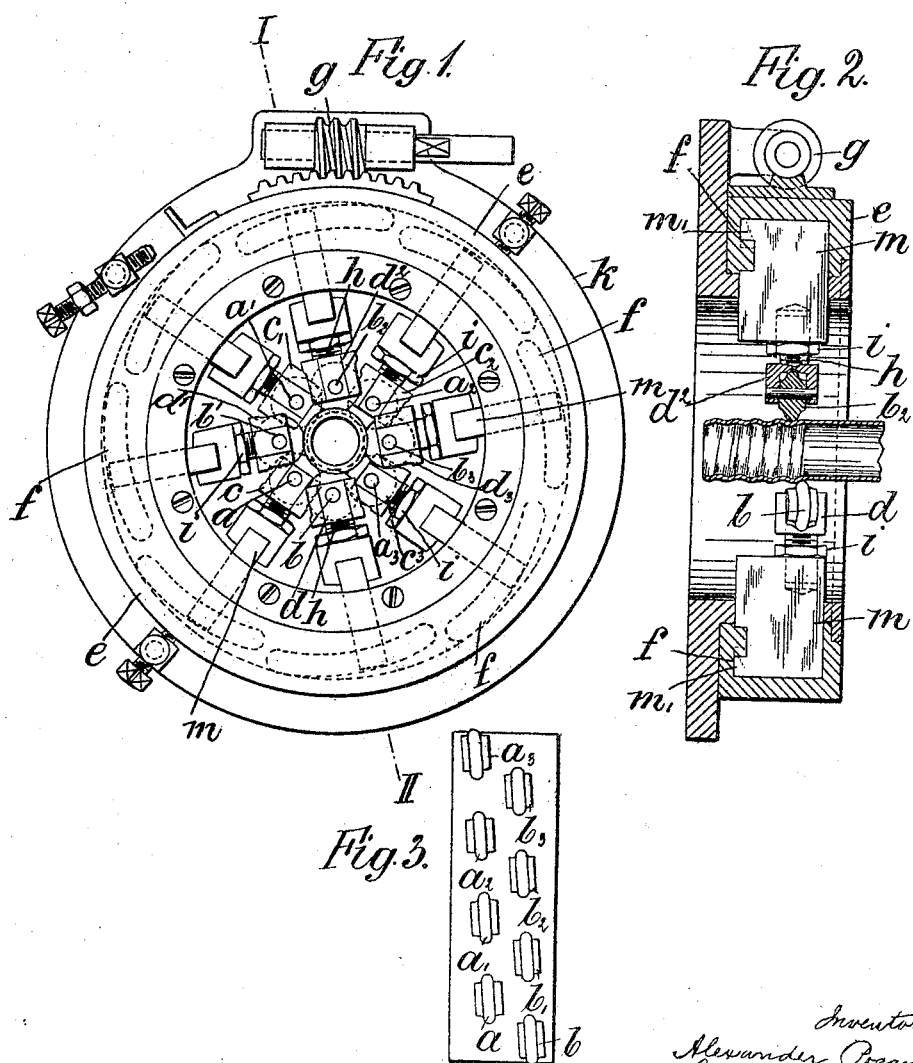

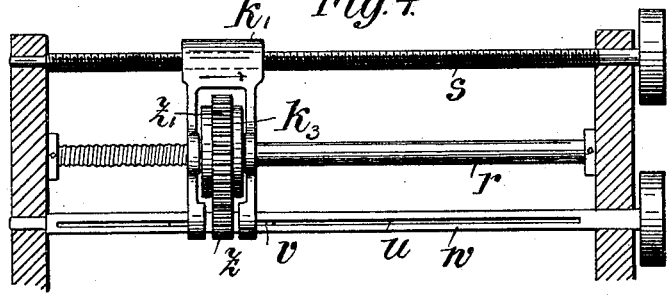
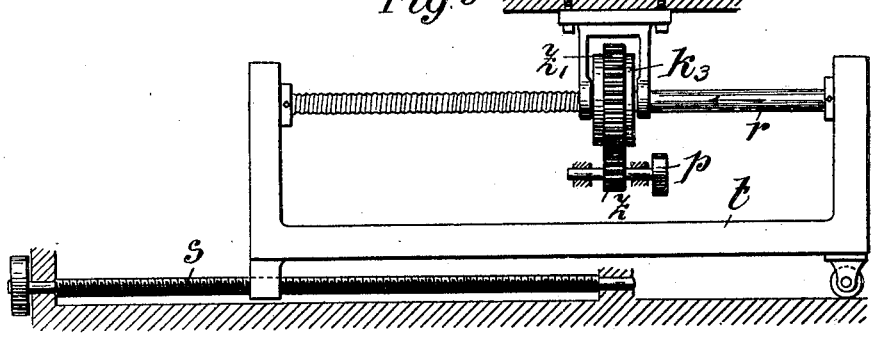

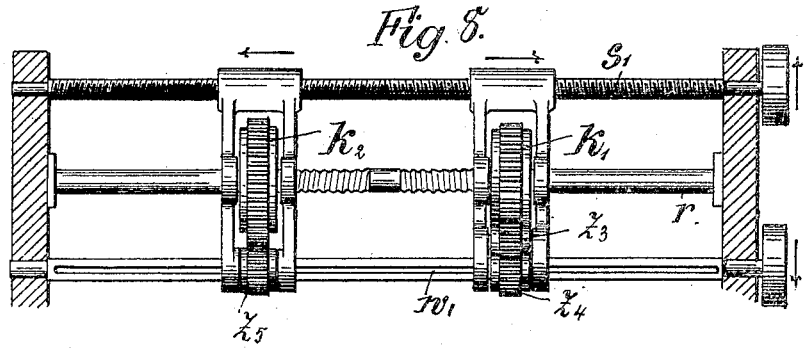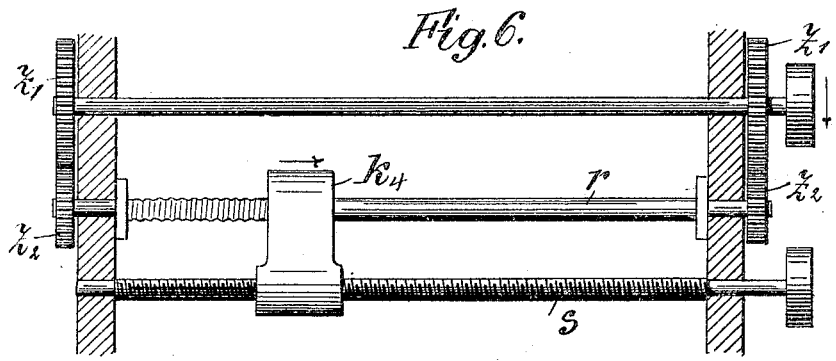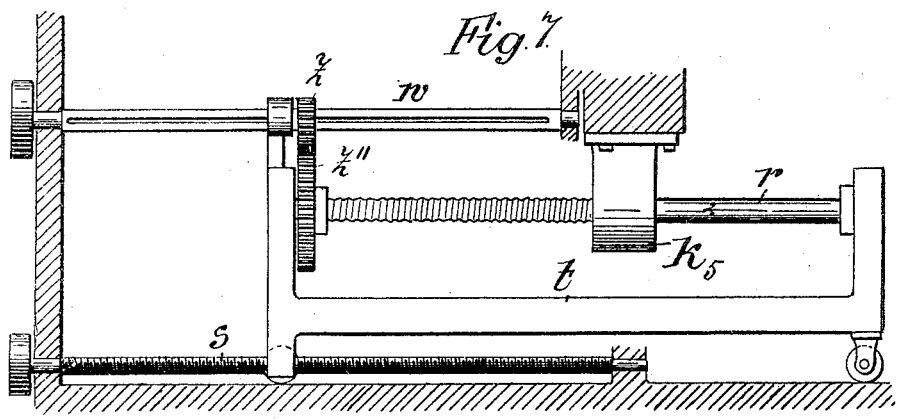

No. 798,448. PATENTED AUG. 29, 1905.
A. POGANY & H. LAHMANN.
MECHANISM FOR CORRUGATING TUBES.
APPLICATION FILED FEB. 15, 1904.
4 SHEETS—SHEET 4.
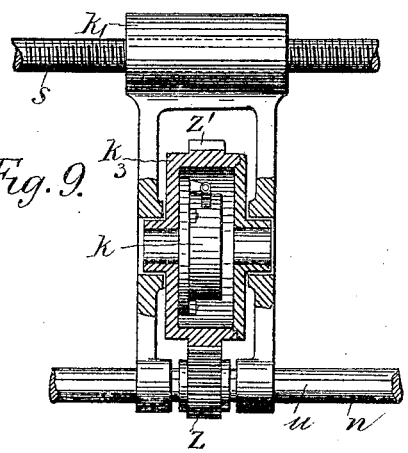
Fig. 9.
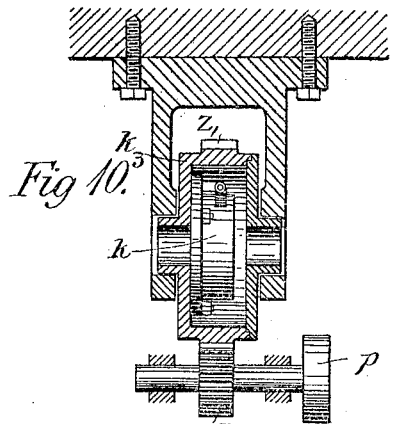
Fig. 10.
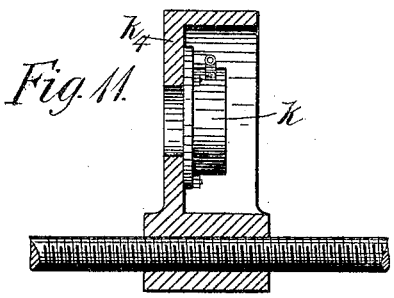
Fig. 11.
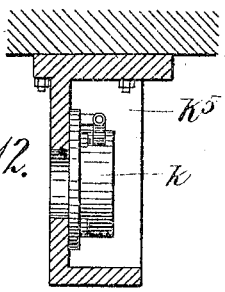
Fig. 12.
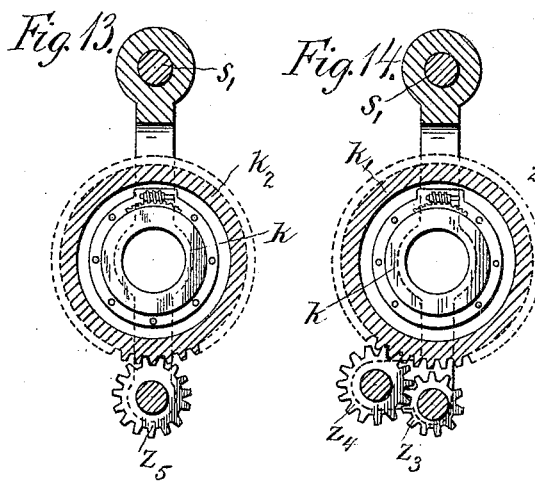
Fig. 13. Fig. 14.
Fig. 15.
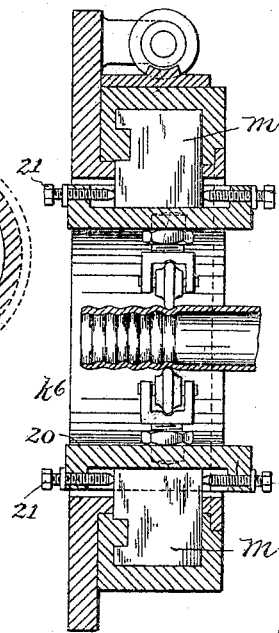
Fig. 16.
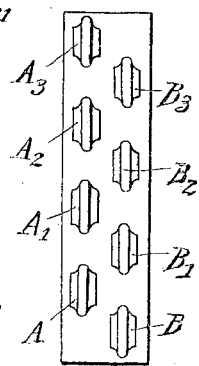
Witnesses:
Inventors
Alexander Pogany
Heinrich Lahmann
by Henry Orth Jr.
Atty.

UNITED STATES PATENT OFFICE.

ALEXANDER POGANY, OF BUDAPEST, AND HEINRICH LAHMANN, OF KOMOTAU, AUSTRIA-HUNGARY.

MECHANISM FOR CORRUGATING TUBES.

No. 798,448. Specification of Letters Patent. Patented Aug. 29, 1905.

Application filed February 15, 1904. Serial No. 193,712.

*To all whom it may concern:*

Be it known that we, ALEXANDER POGANY, a subject of the King of Austria-Hungary, and a resident of Budapest, and HEINRICH LAHMANN, a subject of the King of Prussia, German Emperor, and a resident of Komotau, Austria-Hungary, have invented a new and useful Improvement in Mechanism for Corrugating Tubes, of which the following is a full, clear, and exact description.

The present invention relates to means or machines for corrugating tubes, in the case of which the corrugation of the tubes is produced by rollers, a relative motion of rotation and of translation taking place between the tube and the rollers which are mounted in a housing. The rollers are arranged in more than one thread or row in their housing and are preferably so arranged in such a manner that the rollers of one thread or row are displaced relatively to those of the neighboring set. The rollers as a whole form a series passing round the tube more than once.

In the drawings, Figure 1 shows in elevation one form of construction of the housing and adjacent parts, including the rollers for corrugating tubes according to the present invention, this form being adapted for use in the arrangements shown in Figs. 6 and 7. Fig. 2 is a section on the line I II of Fig. 1. Fig. 3 shows a development of the rollers. Figs. 4, 5, 6, and 7 represent various general arrangements. Fig. 8 shows an arrangement employing two roller-housings, each having its own set of rollers. Figs. 9 to 12 illustrate, on an enlarged scale and in section, the carriers for the roller-housings shown in Figs. 4 to 7, respectively. Figs. 13 and 14 are transverse sectional views of the roller-housings shown in Fig. 8. Fig. 15 is a section showing rollers arranged at right angles to the axis of the tube. Fig. 16 shows a development of the rollers shown in Fig. 15.

Around the tube to be corrugated are eight (by way of example) pressure-rollers, (designated $a$ $a'$ $a^2$ $a^3$ and $b$ $b'$ $b^2$ $b^3$,) so arranged that they form two screw-threads. The number of rollers and also the number of the threads on which they are arranged can, however, be varied as desired. Further, the rollers instead of being arranged to form screw-threads can be arranged in simple rings, the planes of the rings being at right angles to the axis of the tube. The rollers $a$ $a'$ $a^2$ $a^3$ of the one set or turn are circumferentially displaced, as is to be observed from Fig. 3, with regard to the rollers $b$ $b'$ $b^2$ $b^3$ of the second set or turn, so that, for example, the roller $a$ is situated on the left between the rollers $b$ and $b'$, the roller $a'$ on the left between $b'$ and $b^2$, and so on. By this arrangement the distance between the separate rollers is considerably reduced, so that the conditions for the perfect production of corrugations are now fulfilled. The forks $c$ $c'$ $c^2$ $c^3$ and $d$ $d'$ $d^2$ $d^3$, carrying the rollers, are arranged in a ring $e$ in such a way that both a radial motion toward the center of the mechanism and also a twisting of the plane containing the rollers about the axis of the tube can take place. The radial shifting serves for the regulation of the working pressure exerted on the tube to be corrugated, and is so accomplished by means of spirally-shaped grooves $f$, in which the projections $m'$ of the carrier-blocks $m$ engage, or any other suitable arrangement, that all the rollers are simultaneously shifted by a single handle—in the present case by one and the same rotation of the worm $g$. By this means a corrugated tube can be quickly removed from the machine and an uncorrugated tube can be inserted. Each roller-fork is also provided with a thread $h$ and nut $i$, by means of which each roller can be independently adjusted in a radial direction. This enables one to adjust the rollers of the series so that each roller is nearer the axis of the tube than the preceding one. It is then only necessary for the following roller to press deeper the already-indented groove. By this means, on the one hand, a uniform distribution of the total working pressure over all the rollers is obtained, and, on the other hand, a neater production of the corrugations on the tube is brought about. This arangement can be applied in a fourfold manner, as is represented in Figs. 4 to 7.

According to Fig. 4, the tube to be corrugated is held fast and the roller-housing $k$ is given both a motion of rotation and a motion of translation, so that consequently the pressure-rollers run in a helix around the tube $r$ and squeeze in the wall to form the corrugations. To this end the driving of the roller-housing $k$ can be effected by a hollow carrier $k^3$ and the toothed wheel $z$, which is driven from the shaft $w$ with the feather $v$ and groove $a$. This toothed wheel $z$ engages in the toothed ring $z'$ on the carrier $k^3$, which surrounds the roller-housing $k$, and by this means rotates the said housing. The frame $k'$, in which the carrier $k^3$ is mounted, is simultaneously displaced by the screwed spindle $s$ in the longitudinal direction of the tube $r$.

In Fig. 5 the tube $r$ to be corrugated obtains a motion of translation while the housing $k$ is rotated. For this purpose the tube is supported in a frame $t$, which can be displaced in the longitudinal direction of the tube by means of the screwed spindle $s$. The housing $k$, mounted in the hollow carrier $k^3$, Fig. 10, is rotated by the toothed wheel $z$, which is driven by the pulley $p$ and which engages in the toothed ring $z'$ on said carrier.

In Fig. 6 the tube $r$ to be corrugated is rotated by the toothed wheels $z$ $z'$ and $z^2$ $z^2$, while the housing $k$, mounted in the carrier $k^4$, Fig. 11, obtains a motion of translation by means of the screw $s$.

Finally, according to Fig. 7, the tube $r$ to be corrugated is rotated by the shaft $w$ by means of the toothed wheels $z$ and $z''$ and is shifted in its longitudinal direction by the slide $t$ and spindle $s$, while the housing $k$, mounted in the carrier $k^5$, Fig. 12, remains stationary.

The working of the tube can with this apparatus be undertaken both in the cold and in the hot condition. Finally, by means of this new apparatus tubes can also be provided with corrugations which do not run helically around the tube. This is effected by arranging the planes of the rollers at right angles to the axis of the tube and by not moving the roller-housing continually, but at intervals, in the direction of the axis of the tube. Of course on this taking place the roller-housing must be opened after the formation of each corrugation. Such a structure is shown in Figs. 15 and 16, wherein the rollers A, A', A$^2$, and A$^3$ and B, B', B$^2$, and B$^3$ are arranged similarly to those in Fig. 3, but positioned to be at right angles to the axis of the tube instead of in a spiral. The carrier-blocks $m$ support flanged adjusting-blocks 20, through the flanges of which take set-screws 21, engaging the blocks $m$ at the sides. The corrugating-rollers are fixed in these slide-blocks, so that by means of the screws 21 these rollers are moved axially of the housing to vary the pitch of the corrugations, or, if desired, when set in the same plane as shown in Fig. 15 will produce circular corrugations. If a mandrel were employed, the production of non-helically-corrugated tubes could not be carried out, because the mandrel could not be removed after the tubes had been squeezed in.

Instead of a single roller-housing several of these can be employed. Such an arrangement is by way of example shown in Fig. 8. In this arrangement the tube $r$ to be corrugated is stationary and the two roller-housings $k'$ and $k^2$ are moved by means of the right-handed and the left-handed screw-threads of the shaft $s'$ in different directions, thus either both toward the middle or both toward the ends of the tubes. The rotation of the housings is produced by the shaft $w'$ by means of the toothed wheels $z^3$ and $z^4$ and $z^5$, respectively. The arrangement shown in Fig. 8 is such that the roller-housing $k'$ rotates in the opposite direction to the roller $k^2$, (see Figs. 13 and 14,) this being achieved by the housing $k'$, containing in its toothed-wheel gearing one wheel more than the housing $k^2$ contains. In consequence of this arrangement the rollers of each housing then run in screw-threads having the same sense or sign independent of their direction of translation. Both roller-housings can, however, be shifted and rotated in the same direction, and likewise also the tube can be shifted and rotated between the rollers held stationary in the housings, or the two roller-housings can be shifted in the longitudinal direction of the tube and the tube be rotated, or both housings can be rotated and the tube be shifted in its longitudinal direction.

For the case in which tubes are to be provided over half their length with right-handed corrugations and over half their length with left-handed corrugations the toothed-wheel gearing of the housing $k'$ may in the arrangement according to Fig. 8 be made similar to that of the housing $k^2$, so that both roller-housings rotate in the same direction while they are shifted in opposite directions. This kind of tube-corrugation can also be varied by rotating the tube between the rollers of the housings, during which the latter are shifted to different sides in the longitudinal direction, but are not rotated.

The present invention is of course not limited to the particular embodiments described and illustrated; but its scope is given by the following claims.

What we claim is—

1. In a machine for corrugating tubes, the combination with means to support the tube to be corrugated, of a series of laterally-separated, independently-mounted impressing-rollers, a housing containing the rollers and means for producing relative motions of rotation and translation between the housing and tube, whereby through the successive operation of the laterally-arranged series of rollers a groove is bent into the body of the tube, substantially as described.

2. In a machine for corrugating tubes without an internal supporting-mandrel for the tube, the combination with means to support the tube to be corrugated, of a series of laterally-separated, independently-mounted and independently-adjustable impressing-rollers, and means to produce relative motions of translation and rotation between the tube and rollers, whereby through the successive operation of the laterally-arranged series of rollers a spiral groove is bent into the body of the tube, substantially as described.

3. In a machine for corrugating tubes without an internal supporting-mandrel for the tube, the combination with means to support the tube to be corrugated, of series of laterally-separated, independently-mounted and independently-adjustable impressing-rollers, means to simultaneously move the rollers to and from the tube, and means to produce relative motions of rotation and translation between the tube and rollers, whereby through the successive operation of the laterally-arranged series of rollers a spiral groove is bent into the body of the tube, substantially as described.

4. The combination in a machine for corrugating tubes, of means for supporting the tube to be corrugated, a plurality of rollers for forming the corrugations, a housing containing said rollers, means for radially shifting all the rollers simultaneously, consisting of the carrier-blocks $m$, projections $m'$ in said blocks the ring $e$, the spiral grooves $f$ on said ring, in which the projections $m'$ engage, and means for moving the ring with respect to the carrier-blocks, means for radially adjusting each of the rollers separately, and means for producing relative motions of rotation and translation between the housing and the tube.

5. The combination in a machine for corrugating tubes of means for supporting the tube to be corrugated a plurality of rollers for forming the corrugations, a housing containing said rollers, means for radially shifting all the rollers simultaneously the carrier-blocks $m$, forks supporting the rollers, the fork-threads $h$ and the nuts $i$ for adjusting the forks upon the carrier-blocks, and means for producing relative motions of rotation and translation between the housing and the tube.

6. The combination in a machine for corrugating tubes, of means for supporting the tube to be corrugated, two roller-housings, a series of rollers contained in each of said roller-housings for corrugating the tube, means for giving to said roller-housings opposite motions of translation, and means for producing relative motions of rotation and translation between each of the housings and the tube.

7. The combination in a machine for corrugating tubes, of means for supporting the tube to be corrugated, two roller-housings, a series of rollers contained in each of said roller-housings for corrugating the tube, a shaft having a right-handed and a left-handed screw-thread engaging said housings and imparting thereto opposite motions of translation, another shaft for rotating said housings, and two sets of toothed-wheel gearing driving said housings from said shaft, the one gearing having one more wheel than the other gearing, whereby the rollers of both housings run in screw-threads having the opposite sign and have at the same time opposite motions of translation.

8. In a machine for corrugating tubes without a mandrel for the tube, a housing, a set of independent rollers mounted therein to pass around the tube more than once, each roller having a single corrugating-surface, means to independently set the rollers and means to simultaneously move them to and from the tube, substantially as described.

In testimony whereof we have signed our names to this specification in the presence of two subscribing witnesses.

ALEXANDER POGANY.
    HEINRICH LAHMANN.

Witnesses:
 JULIUS MICKERTS,
 ALVESTO S. HOGUE.